United States Patent
Piccin et al.

(10) Patent No.: US 11,673,471 B2
(45) Date of Patent: Jun. 13, 2023

(54) VEHICLE CONTROL PANEL WITH PRESSURE-SENSITIVE SWITCH

(71) Applicant: Faurecia Interior Systems, Inc., Auburn Hills, MI (US)

(72) Inventors: Hugo Piccin, Cupertino, CA (US); Mark Greenspan, Oakland, CA (US); Lavinia Danielescu, San Francisco, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 96 days.

(21) Appl. No.: 17/244,409

(22) Filed: Apr. 29, 2021

(65) Prior Publication Data
US 2022/0348082 A1    Nov. 3, 2022

(51) Int. Cl.
*B60K 37/06* (2006.01)
*B60R 11/02* (2006.01)
*H02J 50/00* (2016.01)

(52) U.S. Cl.
CPC .......... *B60K 37/06* (2013.01); *B60R 11/0241* (2013.01); *B60K 2370/1434* (2019.05); *B60K 2370/339* (2019.05); *H02J 50/00* (2016.02)

(58) Field of Classification Search
None
See application file for complete search history.

(56) References Cited

U.S. PATENT DOCUMENTS

| | | | | |
|---|---|---|---|---|
| 5,943,044 | A * | 8/1999 | Martinelli | G06F 3/03547 345/174 |
| 2016/0062626 | A1 * | 3/2016 | Kubota | B60K 37/06 715/716 |
| 2017/0206831 | A1 | 7/2017 | Schmittat | |
| 2019/0135199 | A1 * | 5/2019 | Galan Garcia | B60K 35/00 |
| 2019/0227667 | A1 | 7/2019 | Harrison et al. | |
| 2020/0241678 | A1 * | 7/2020 | Yeom | G06F 3/04883 |
| 2020/0369223 | A1 * | 11/2020 | Hansen | G06F 3/0412 |
| 2021/0019033 | A1 * | 1/2021 | Thevenin | G06F 3/044 |

FOREIGN PATENT DOCUMENTS

| | | |
|---|---|---|
| DE | 102014019439 A1 | 6/2016 |
| WO | 2018013557 A1 | 1/2018 |
| WO | 2019114981 A1 | 6/2019 |
| WO | 2019165441 A1 | 8/2019 |

\* cited by examiner

*Primary Examiner* — Matthew Yeung
(74) *Attorney, Agent, or Firm* — Reising Ethington P.C.

(57) ABSTRACT

A vehicle interior control panel includes a pressure-sensitive slider switch embedded within the thickness and beneath a decorative surface of a deco panel. The slider switch in non-visible and includes a variable resistance layer that sequentially and electrically connects different pairs of electrical contacts in the deco panel as a user-applied pressure is moved across the decorative surface and over the slider switch. The slider switch operates to change a parameter or characteristic of a display panel during use. Light from a light source beneath the deco panel is emitted at the decorative surface through otherwise non-visible perforations. The control panel appears to be only a wood panel until activated via user-applied pressure.

20 Claims, 4 Drawing Sheets

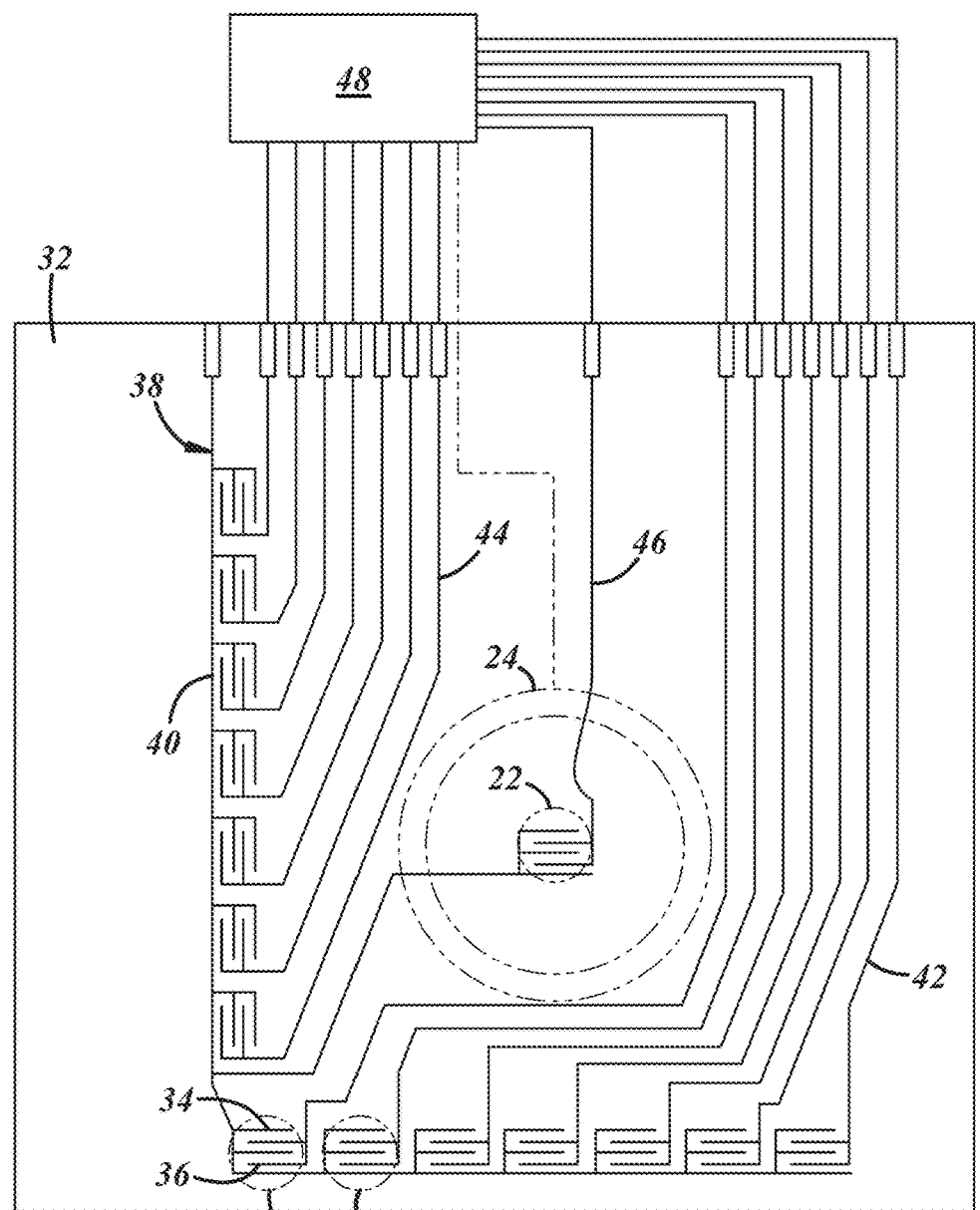
FIG. 4
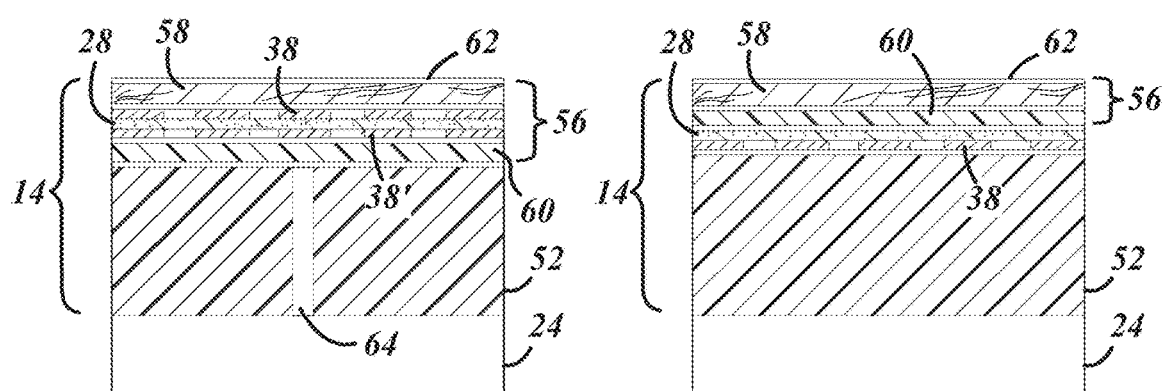
FIG. 6  FIG. 7

VEHICLE CONTROL PANEL WITH PRESSURE-SENSITIVE SWITCH

TECHNICAL FIELD

The present disclosure is related generally to vehicle interiors and, more particularly, to control panels accessible from vehicle interiors.

BACKGROUND

Touch controls have become prevalent in nearly all aspects of modern daily life, whether at home, in vehicles, working on computers, using mobile electronic devices, etc. Most of these touch controls are in the form of electronic display screens like those on smartphones or tablets, which generally include a glass face with transparent conductive elements on the inside of the glass configured to sense the position of a user's touch by capacitive means. While these touch controls have certain advantages over more traditional controls like knobs, levers, and pushbuttons, they also have certain limitations. For instance, inadvertent touching and the resulting unintended change in a touch-controlled function is a common frustration with capacitive touch screens. Also, hard glass surfaces and electronic images do not necessarily blend in well with the aesthetic and warmth of luxury vehicle interior materials like cushioned leather, natural wood, or textured fabrics. Moreover, they are subject to glare in sunlight and provide only an empty black space when turned off.

Attempts have been made to alter the appearance of touch controls in vehicle environments. In one example, German patent document DE 102014019439 by Wachinger discloses a cladding device for a motor vehicle with a cladding element which is provided as a plate or film and has a wood or metal decorative surface. The device uses capacitive touch sensing and therefore has at least some of the same problems as the above-described touch controls. Wachinger also fails to maintain the informational display function of other touch controls without defacing the wood or metal surface via large cutouts.

SUMMARY

In accordance with various embodiments, a vehicle interior control panel includes a pressure-sensitive slider switch beneath a decorative surface. The slider switch is configured to change a parameter of a display panel when a user-applied pressure is moved from one location to another location along the decorative surface.

In various embodiments, the slider switch includes a variable resistance layer configured to complete a different circuit at each respective location of the user-applied pressure and to open each circuit when the user-applied pressure is moved away from each location at which one of the circuits is completed. A resistance of the variable resistance layer is lower at the location of the user-applied pressure than at locations with no user-applied pressure.

In various embodiments, the control panel includes a pair of separated electrical contacts beneath the decorative surface at each of said locations. The slider switch conductively connects the pair of electrical contacts at the location of the user-applied pressure and disconnects the same pair of electrical contacts when the user-applied pressure is removed.

In various embodiments, the control panel includes a conductive layer in contact with a variable resistance layer at each location. The user-applied pressure electrically connects one electrical trace of the conductive layer with another electrical trace of the conductive layer at each location of the user-applied pressure, and the electrical traces are disconnected at the same location when the user-applied pressure is removed.

In various embodiments, the control panel includes a variable resistance layer, a first conductive layer in contact with one side of the variable resistance layer, and a second conductive layer in contact with an opposite side of the variable resistance layer. The user-applied pressure electrically connects the first conductive layer with the second conductive layer at each location of the user-applied pressure and the conductive layers are disconnected at the same location when the user-applied pressure is removed.

In various embodiments, the control panel includes a conductive layer printed on a variable resistance layer, a decorative layer, or a transparent layer.

In various embodiments, the control panel includes an additional pressure-sensitive slider switch beneath the decorative surface. The second slider switch is configured to change a different parameter of the display panel when the user-applied pressure is moved from one location to another location along the decorative surface over the additional slider switch.

In various embodiments, the display panel includes a light source and said parameter is an intensity or a color of light from the light source.

In various embodiments, the control panel includes the display panel and includes a light source beneath the decorative surface. Light from the light source is emitted from the display panel through the decorative surface.

In various embodiments, the decorative surface is provided by a fabric or a non-polymeric decorative layer.

In various embodiments, the decorative surface comprises a pattern of perforations that permit visible light to pass through when backlit and that are non-visible when not backlit.

In various embodiments, the control panel includes a diffraction material that imparts a radial component to a direction of light passing through the perforations.

In various embodiments, the control panel includes a base, a deco panel supported by the base, and a light source disposed between the base and the deco panel. The deco panel has a uniform thickness and the slider switch is located within the thickness of the deco panel.

In various embodiments, the location of the slider switch is non-visible.

In various embodiments, the control panel includes a wireless charger beneath the decorative surface. At least a portion of the slider switch overlaps the wireless charger.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein:

FIG. 4 is a plan view of a conductive layer of a deco panel of the control panel, schematically connected to a light source controller;

FIG. 6 is a cross-sectional view illustrating various layers of the control panel;

FIG. 7 is a cross-sectional view illustrating a variation of the layers of the control panel;

DESCRIPTION OF ILLUSTRATIVE EMBODIMENTS

Described below is a vehicle interior control panel employing one or more pressure-sensitive switches that provide positional tracking of a user finger or stylus along a control surface without the pitfalls of capacitive touch sensing, such as accidental actuation or lack of actuation when the user is wearing a glove, for example.

Figure 1:
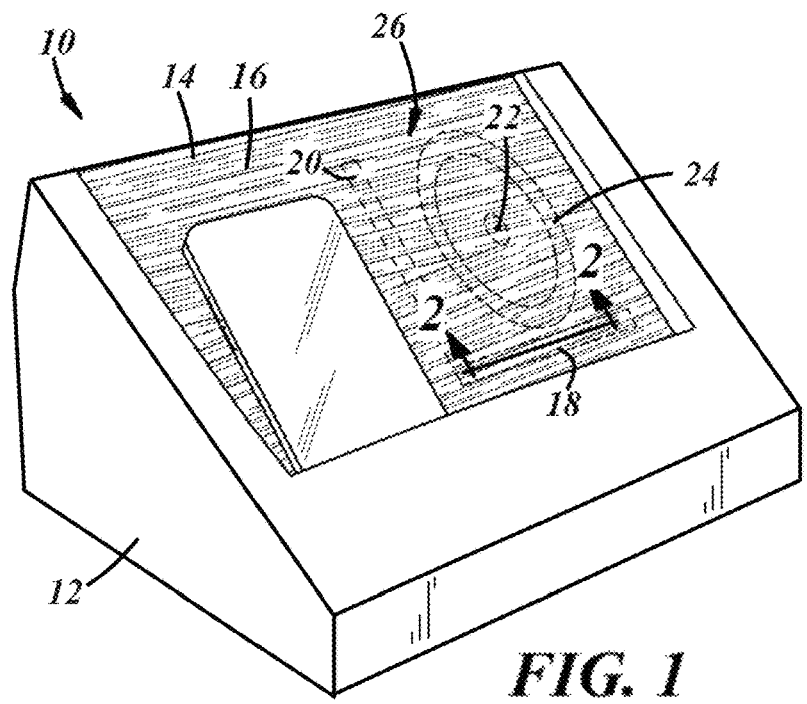
FIG. 1 is a perspective view of an illustrative vehicle interior control panel.

FIG. 1 is a perspective view of an exemplary vehicle control panel 10 configured for installation and use in a vehicle interior. The illustrated example is made to fit near the front of the passenger cabin as part of an instrument panel or center console. The control panel 10 of FIG. 1 doubles as a wireless charger for a portable electronic device, which is not typically possible on capacitive touch control panels due to the shielding effect of a continuous conductive layer. The control panel 10 includes a base 12 and a deco panel 14 that fits on the base. The base 12 provides the overall shape and structure of the panel 10 and may be made from molded plastic or other suitable material. The deco panel 14 presents a decorative surface 16, which is also the control surface, to the vehicle interior. The illustrated control panel 10 is made so that the base 12 can receive different deco panels 14 of the same size but having a different aesthetic and/or functionality to enable modularity and ease of customization for different vehicle models.

The illustrated control panel 10 includes a first slider switch 18 and a second slider switch 20. The slider switches 18, 20 are shown in broken lines in FIG. 1 because they are located beneath the decorative surface 16 and are not visible to vehicle occupants. In particular, the slider switches 18, 20 are located within the thickness of the deco panel 14, as discussed in further detail below. Also concealed beneath the decorative surface 16 in this example are a power switch 22 and a light source 24, the locations of which are also indicated with broken lines. Like the slider switches 18, 20, the power switch 22 is also located within the thickness of the deco panel 14 and is a pressure sensitive switch. The light source 24 is disposed between the deco panel 14 and the base 12. The light source 24 is annular or ring-shaped in this non-limiting example. One or more layers of the deco panel 14 may include a pattern of non-visible perforations formed through otherwise opaque layers of the panel 14 so that light from the light source can be emitted from the deco panel 14 and into the vehicle interior. The deco panel 14 and the light source 24 may thus together be considered a display panel 26. The slider switches 18, 20 may be used to control a separate display panel and/or some other vehicle parameter in other embodiments.

In the following description, only one of the two illustrated slider switches 18, 20 may be referred to for the sake of simplicity, but the description is applicable to both the first and second slider switch as well as to any additional slider switch. Each slider switch 18 is configured to change a parameter of the display panel 26 when a user-applied pressure is moved from one location to another location along the decorative surface 16. This functionality differs from a capacitive touch control in various ways. First, capacitive touch controls require no pressure or force to be applied by the user. The pressure-sensitive slider switch 18 described here will not operate without user-applied pressure. Second, capacitive touch controls generally rely on some amount of electrical conductivity or field disruption caused by the user's finger or another conductive article. The pressure-sensitive slider switch 18 described here will operate when the pressure is applied by anything, including non-conductive articles. These advantages also hold true for a single pressure-sensitive switch such as the power switch 22 or some other switch configured to change a parameter of the display panel or to change some other vehicle parameter.

Figure 2:
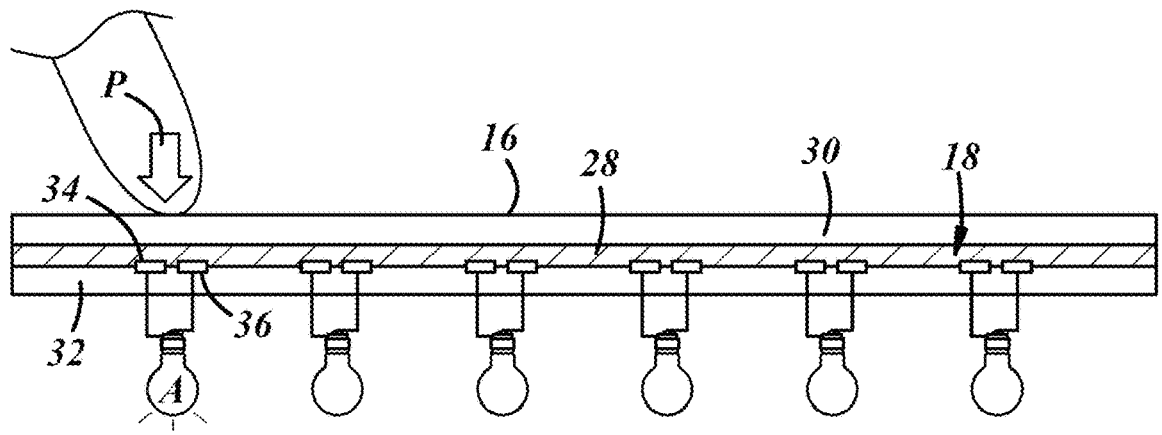
FIG. 2 is a schematic cross-sectional view of a slider switch from FIG. 1.
Figure 3:
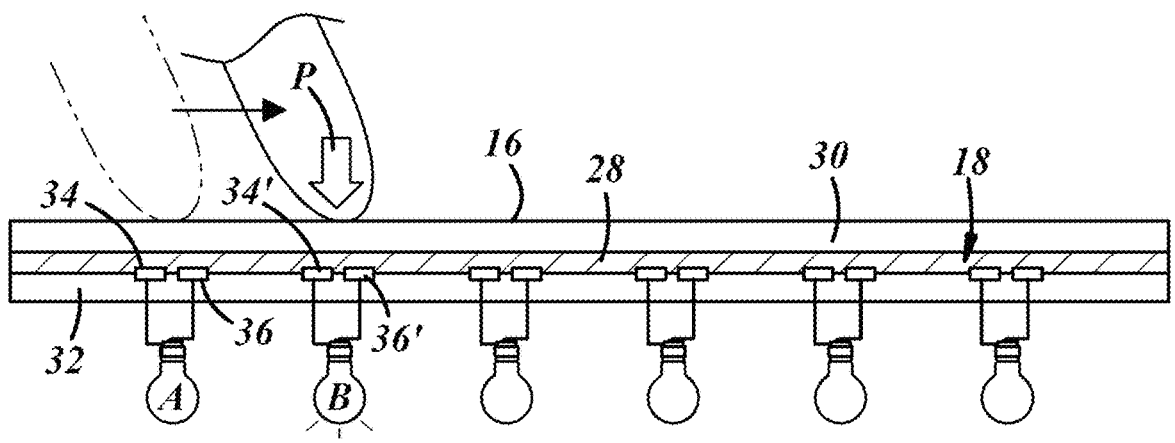
FIG. 3 is the schematic cross-sectional view of FIG. 2 illustrating movement of a user-applied pressure.

FIGS. 2 and 3 schematically illustrate operation of the pressure-sensitive slider switch 18. Here, the incandescent bulb shapes are provided merely as an indicator as to where a particular circuit is completed (glowing bulb) or open (non-glowing bulb). The slider switch 18 includes and relies on a variable resistance material for operation. The example of FIG. 2 includes a variable resistance layer 28 disposed between a decorative layer 30 and a carrier layer 32. Multiple pairs of electrical contacts are arranged along the variable resistance layer 28. Each pair of electrical contacts includes separate first and second contacts 34, 36 in contact with the variable resistance layer 28. The variable resistance layer 28 is configured to have a locally reduced electrical resistance where it is compressed or has an external force applied. This layer 28 may be or may include a film or foil with conductive particles suspended in a polymer matrix. One suitable example is a polyolefin or other plastic material impregnated with carbon particles and is available under the trade name Velostat®. Such materials are typically used in packaging to protect electronics that are sensitive to electrostatic discharge, but their variable resistance properties have now found a new use.

The variable resistance layer 28 is configured to complete a different circuit at each respective location of the user-applied pressure (P) and to open each circuit when the user-applied pressure is moved away from each location at which one of the circuits is completed. In this simplified example, the user-applied pressure is applied at a first location (A) along the decorative surface in FIG. 2, locally reducing the resistance of the variable resistant layer 28 and completing a first circuit by effectively connecting the electrical contacts 34, 36 at that location. When the user-applied pressure is moved along the decorative surface 16 to a different second location (B) as in FIG. 3, the connection between the contacts 34, 36 is interrupted—i.e., circuit A is opened—and a different pair of electrical contacts 34', 36' are connected to complete the second circuit. As the user-applied pressure is moved along the decorative surface 16 over the slider switch 18, successive pairs of electrical contacts are connected and disconnected as the user-applied pressure moves over and away from each pair. Each slider switch 18 may thus be considered as a plurality of individual pressure-sensitive switches, each defined in part by a respective pair of the electrical contacts 34, 36, arranged along the panel 14 sufficiently close so that, as user-applied pressure moves across the decorative surface, the individual switches sequentially complete and open adjacent circuits in a continuous manner.

FIG. 4 is a plan view of a conductive layer 38 of the deco panel 14. Here, the conductive layer 38 is in the form of electrical traces on a carrier layer 32. The electrical traces include a power trace 40, a first plurality of traces 42 associated with the first slider switch 18, a second plurality of traces 44 associated with the second slider switch 20, and an activation trace 46 associated with the power switch 22. The intended location of the power switch 22 and light source 24 are illustrated in phantom. The power trace 40 is configured to accept an applied voltage and provides the first electrical contact 34 for each pair of contacts. In the illustrated example, each first contact 34 is in the form of two fingers interlaced with two fingers of each second contact 36. The interlaced multi-finger contacts 34, 36 increase the effective area of each the slider switches.

Each trace associated with a switch is configured for connection with a controller 48. In this case, each trace is routed to a common edge of the carrier layer 32 for ease of connection with an external controller 48. The controller 48 is configured to receive inputs from each of the traces 42-46 and to control the light source 24 accordingly. In some embodiments, the light source 24 is part of an LED assembly with an integrated controller. The traces of the conductive layer 38 may be within the thickness of the deco panel 14 and routed to avoid blocking light from the light source 24 and/or light traveling through a perforation in an underlying layer. For example, each trace may be routed between perforations in one of more layers of the deco panel 14 and/or between individual LEDs of the light source 24.

The conductive layer 38 is in contact with the variable resistance layer 28 of the deco panel 14 at least at each of the locations where pairs of separate electrical contacts 34, 36 are situated. Locations A and B from FIG. 3 are annotated in FIG. 4 by way of example. The user-applied pressure electrically connects the power trace 40 of the conductive layer 38 with an electrical trace 42-46 associated with one of the switches 18-22 at each respective location of the user-applied pressure, and the electrical traces are disconnected at the same location when the user-applied pressure is removed or moves away from a connection.

In one embodiment, the light source 24 comprises one or more multi-color LEDs, the first slider switch 18 changes the color of light emitted by the light source, and the second slider switch 20 changes the intensity of the light. For example, as the user-applied pressure is moved from left to right over the first slider switch 18, the controller 48 recognizes the location along the switch instantly being pressed and gradually changes the color being emitted by the LEDs from a first color, to a different second color, etc., and changes the color in reverse order as the user-applied pressure moves from right to left. Similarly, as the user-applied pressure is moved from bottom to top over the second slider switch 20, the controller 48 recognizes the location along the switch instantly being pressed and gradually increases the intensity of light from the LEDs. The controller 48 decreases the intensity as the user-applied pressure moves from top to bottom along the second slider switch 20. The power switch 22 may serve to activate the control panel 10 by providing power to the light source 24 and/or controller 48 when pressed, and to deactivate the control panel from the activated condition.

Light color and intensity are merely proof-of-concept examples of parameters of the display panel 26 that can be changed by use of the slider switches. The panel 10 may be configured so that a slider switch changes the order in which multiple LEDs repeatedly illuminate to present different animations, the frequency of illumination, etc. The controller 48 may be in communication with other vehicle systems as well. For example, a slider switch may be configured to change a climate control temperature set-point with the color of the light emitted being associated with the set-point— e.g., blue for cold, red for hot, and intermediate colors in-between. Or a slider switch may be configured to adjust the volume of an audio system with the number of illuminated LEDs indicating the relative volume. The controller 48 may also receive information from other vehicle systems, such as alerts or warnings, and illuminate the light source in a particular combination of color, intensity, pattern, and/or frequency to notify vehicle occupants independently from the slider switches.

In other examples, a slider switch can be configured to adjust the position of various vehicle components, such as mirrors, seats, windows, a sunroof, or a convertible top, with or without also changing a parameter of the display panel. Other vehicle system settings, such as audio settings (e.g., tone, balance, etc.) or vehicle mode (e.g., economy vs. sport mode) may be controlled via the control panel 10 and associated switches and/or communicate setting status to vehicle occupants via the display panel 26. The pressure-sensitive switches may also find use elsewhere in a vehicle, to detect the presence of people or objects on a seat or on the vehicle floor, or as a keyboard or other data entry interface.

Figure 5:
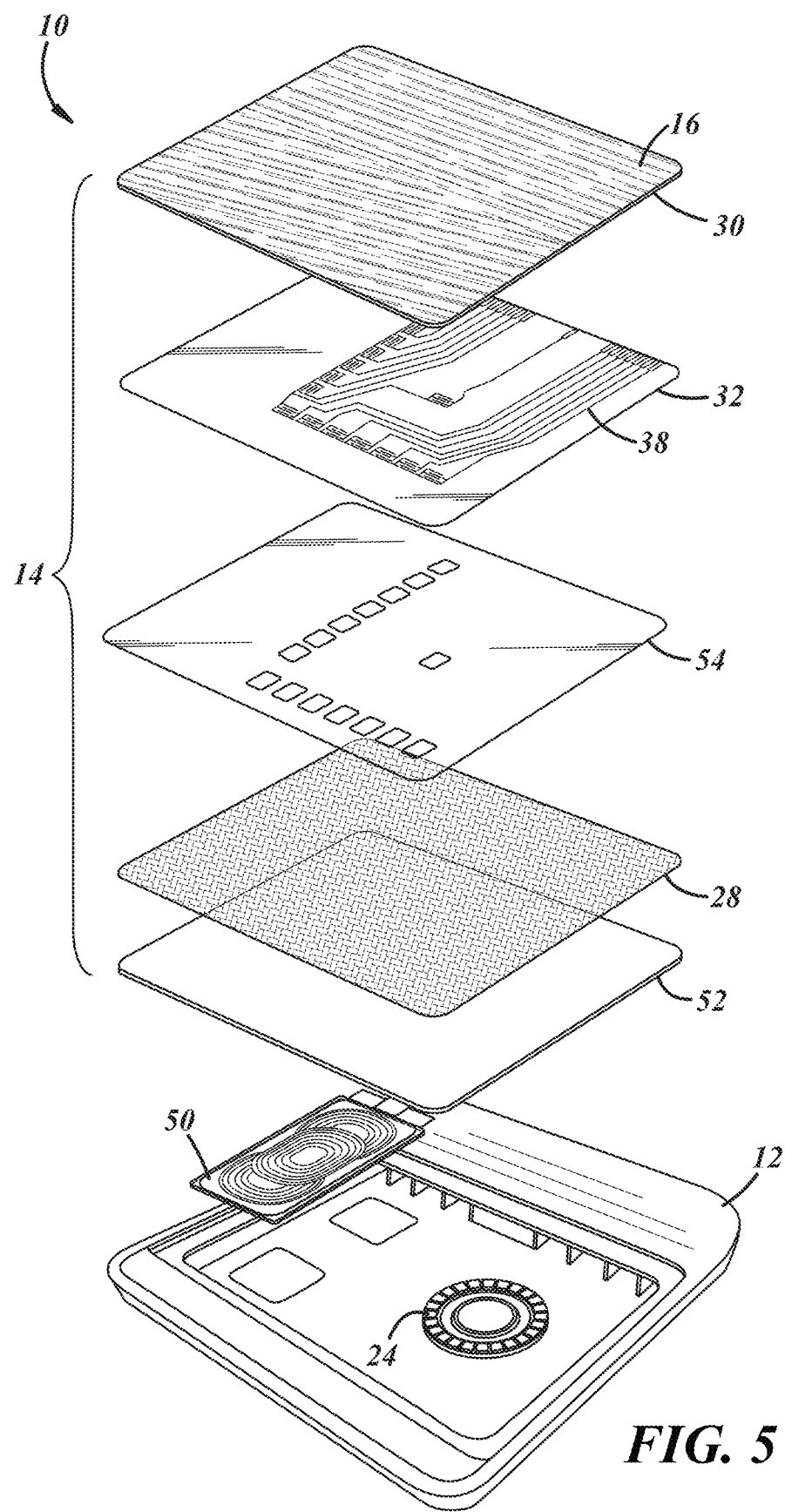
FIG. 5 is an exploded view of an illustrative vehicle interior control panel.

FIG. 5 is an exploded view of an embodiment of the control panel 10, including the base 12, the deco panel 14, the light source 24, and a wireless charging module 50. The light source 24 includes a plurality of LEDs arranged in a ring shape and is mounted to the base 12. The charging module 50 is also mounted to the base 12 beneath the deco panel 14. In this example, the deco panel 14 includes a substrate or backing layer 52 and an adhesive layer 54 in addition to the variable resistance layer 28, the decorative layer 30, the carrier layer 32, and the conductive layer 38.

The substrate 52 may be the thickest individual layer of the deco panel 14 and provides the panel 14 with rigidity and structural integrity during use and during assembly of the deco panel to the base 12. The substrate 52 may for example be formed from a plastic (e.g., polycarbonate) or other suitable material and have a thickness in a range from 1.5 mm to 3.0 mm. The thickness of the substrate may constitute from about 50% to about 75% of the total thickness of the deco panel 14. The deco panel 14 may have a uniform thickness in a range between 2.0 mm and 5.0 mm. Depending on the particular embodiment, it may be desirable that the substrate is formed from a transparent or translucent material.

The variable resistance layer 28 is beneath the conductive layer 38 in this example and may have a thickness of about 0.1 mm. This layer 28 may be provided in full sheet form as illustrated in the example of FIG. 5, or it may be selectively applied only where slider switch functionality is required. For example, a first strip of variable resistance material may be arranged to overlap the pairs of electrical contacts associated with the first slider switch 18, a second strip of variable resistance material may be arranged to overlap the pairs of electrical contacts associated with the second slider switch 20, and a patch of variable resistance material may be arranged to overlap the pairs of electrical contacts associated with the power switch 22. In some embodiments, the variable resistance layer 28 is omitted over the wireless charging module. When used in full sheet form as in FIG. 5, openings may be formed through variable resistance layer 28 and aligned with the light source 24 to allow light to pass through. Such openings need not be non-visible microperforations since they are covered by other layers. Rather, any such light passages through the variable resistance layer 28 should be as large as is practical to minimize light blockage.

The adhesive layer 54 is disposed between the variable resistance layer 28 and the conductive layer 38 in the example of FIG. 5 and has cut-outs through which the variable resistance layer and the conductive layer contact each other at the various pairs of electrical contacts. In one embodiment, the adhesive layer 54 is a transparent acrylic adhesive layer having a thickness of about 0.2 mm. The adhesive layer 54 may be provided as a double-sided tape to permit handling and formation of the cut-outs prior to assembly.

The conductive layer 38 of FIG. 5 is applied on the downward facing side of the carrier layer 32—i.e., on the side of the carrier layer 32 that faces the variable resistance layer 28. In one embodiment, the carrier layer 32 is a transparent sheet such as a PET film having a thickness of about 0.2 mm. The electrical traces of the conductive layer 38 may be patterned onto the carrier layer 32 by printing a conductive ink on the carrier layer. The conductive ink may have a high content of a conductive metal (e.g., silver) and can be printed via silk screen or by inkjet, depending on the particular ink. Other more traditional trace making techniques may be employed as well, such as mask-and-plate or foil applique. In various other embodiments, the conductive layer 38 is applied directly on the substrate, the variable resistance layer 28, or the decorative layer 30 so that the carrier layer 32 can be omitted. In other embodiments, there are two conductive layers—one on each opposite face of the variable resistance layer 28 such that the first and second electrical contacts 34, 36 are on opposite sides of the variable resistance layer and electrically connected through the variable resistance layer when pressure is applied.

The decorative layer 30 provides the decorative surface 16 of the deco panel 14, which is also the control surface and the display surface in the illustrated example. The decorative layer 30 may itself have multiple layers. In one example, the decorative layer 30 is a wood sheet complex (WSC) that includes a thin layer of genuine wood bonded to a backing layer and topped by a clear protective layer. The decorative surface 16 in that case is a wood surface. In another example, the decorative layer 30 is or includes a fabric layer. Such a fabric layer may be a woven fabric layer with the weave effectively forming microperforations in the decorative surface 16. The decorative layer 30 preferably provides the decorative surface 16 in the form of a premium material, such as something other than a polymeric film layer. Examples of premium materials include wood, fabric, carbon, carbon fiber, stone or mineral veneers, and sheet metals such as aluminum, stainless steel, etc. In various embodiments, the decorative layer 30 is constructed of a combination of material type and thickness such that the decorative layer will deflect under a 5 kg/cm$^2$ load sufficiently to compress the variable resistance layer enough to close the respective circuit. Various combinations and arrangements of layers are possible, some of which are discussed further below in conjunction with additional figures, which are not necessarily to scale.

FIG. 6 is a cross-sectional view of a portion of one example of the vehicle control panel illustrating its layered structure. The deco panel 14 is arranged over the light source 24 and includes the substrate 52 and a wood sheet complex 56. In this example, the slider switch, including the variable resistance layer 28, is formed as part of the wood sheet complex. The WSC 56 includes a genuine wood layer 58 and at least one other non-wood layer, such as a backing layer 60. In this case the variable resistance layer 28 and first and second conductive layers 38, 38' are disposed between the wood layer 58 and backing layer. The wood layer 58 has a thickness between 0.25 mm and 0.5 mm, or about 0.35 mm. A thin adhesive film of about 0.01 mm is applied to the back side of the wood layer, and the first conductive layer 38 is printed onto the applied film. The backing layer 60 has a thickness between 0.4 mm and 0.6 mm, or about 0.5 mm. One suitable backing layer 60 is a PA/PES microfiber material. A thin adhesive film of about 0.01 mm is applied to the top side of the backing layer 60, and the second conductive layer 38' is printed onto that film. The variable resistance layer 28 is disposed between the conductive layers 38, 38' with the thin adhesive films holding the layers together. A thin protective layer 62 (e.g., 0.03-0.04 mm polyurethane) is added, either before or after the other WSC layers are bonded together, to form the WSC 56 having a thickness between 0.6 mm and 0.9 mm. The WSC 56 is then bonded to the substrate 52 with an adhesive layer. This particular example includes apertures 64 through the substrate to facilitate light transmission. Additionally or alternatively, the substrate is transparent.

In the example of FIG. 7, the slider switch is formed outside of the WSC 56. The WSC 56 includes a genuine wood layer 58 and a backing layer 60 with the variable resistance layer 28 and conductive layer 38 disposed between the WSC and the substrate 52. The wood layer 58 has a thickness between 0.25 mm and 0.5 mm, or about 0.35 mm. A thin adhesive layer of about 0.15 mm is applied to the back side of the wood layer 58, to adhere the backing layer 60. The conductive layer 38 is printed or otherwise applied to one or both sides of the variable resistance layer 28. Adhesive layers on both opposite sides of the printed variable resistance layer 28 adhere the WSC 56 on top and the substrate 52 on the bottom.

Figure 8:
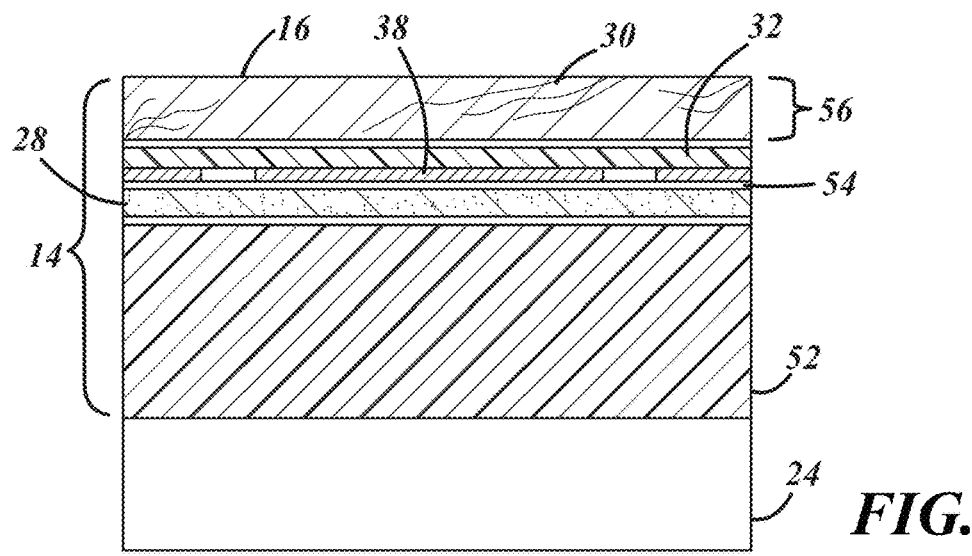
FIG. 8 is a cross-sectional view illustrating the layers of the control panel of FIG. 5.

FIG. 8 is representative of the example of FIG. 5, where the deco panel 14 includes the substrate 52, the variable resistance layer 28, the conductive layer 38 printed on the carrier layer 32, and the decorative layer 30, which in this case is a wood sheet complex. The adhesive layer 54 between the variable resistance layer 28 and the conductive layer 38 may have cutouts in registration with the various pairs of electrical contacts as shown in FIG. 5. Similarly thin adhesive layers are disposed between the substrate 52 and the variable resistance layer 28, and between the carrier layer 32 and the decorative layer 30.

In order to permit light from the light source 24 to be emitted at the decorative surface 16, one or more patterns of perforations may be formed through the decorative layer 30. The perforations may be microperforations, meaning that they have a diameter or width less than 0.5 mm (500 microns). In some embodiments, the microperforations have diameters in a range from 0.02 mm to 0.3 mm. In some embodiments, the microperforations are not visible to the naked eye when the light source is not emitting light. It has been determined that microperforations having diameters of 0.04 mm or less are not visible without backlighting, particularly when formed through a decorative layer 30 that is a wood sheet complex with visible wood grain as the decorative surface. In a particular example, the pattern of microperforations formed through the decorative layer 30 has a mixture of diameters in a range from 0.02 mm to 0.04 mm. It is also possible to include microperforations in a range from 0.08 mm to 0.3 mm in diameter in applications where invisibility of the perforations is not required. In some cases, non-visible microperforations are formed through the wood layer 58 with larger perforations formed through the backing layer of the WSC. The microperforations may be laser-formed.

Figure 9:
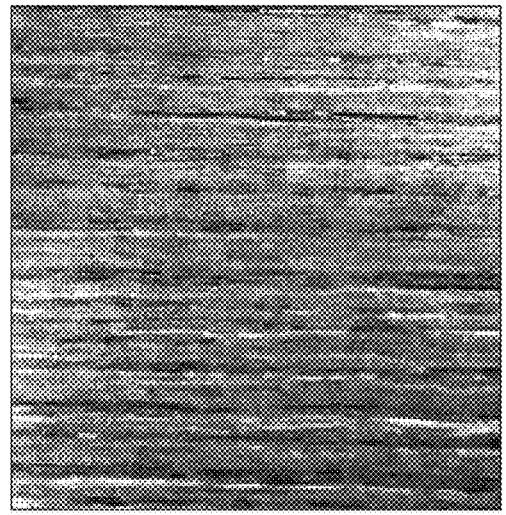
FIG. 9 is a view of a portion of the decorative surface of a control panel with non-visible microperforations.
Figure 10:
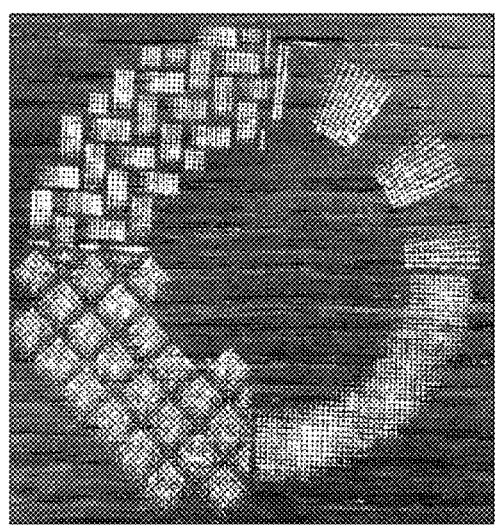
FIG. 10 is the decorative surface of FIG. 9 with the microperforations backlit by a light source.

FIGS. 9 and 10 are photographic images of the decorative surface of an exemplary control panel with non-visible microperforations formed through a wood sheet complex. As shown in FIG. 9, the perforations are not visible to the naked eye when not backlit. As shown in FIG. 10, the perforations can be arranged with various mixtures of sizes and patterns to create different visual effects when the light source is activated. The illuminated area of FIG. 10 is approximately 2.5 inches (~65 mm) across.

Optionally, a diffraction material may be disposed in or on the perforations. Filling the perforations with a diffraction paste, for example, may add a radial component to the direction of light being emitted through each perforation and permit the emitted light pattern to be visible at a wider angle than with nothing filling the perforations. The diffraction paste may serve the dual purpose of preventing dust or debris from clogging the perforations.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior control panel comprising a pressure-sensitive slider switch beneath a decorative surface,
   wherein the slider switch is configured to change a parameter of a display panel when a user-applied pressure is moved from one location to another location along the decorative surface, and
   wherein the slider switch comprises a variable resistance layer configured to complete a different circuit at each respective location of the user-applied pressure and to open each circuit when the user-applied pressure is moved away from each location at which one of the circuits is completed, a resistance of the variable resistance layer being lower at the location of the user-applied pressure than at locations with no user-applied pressure.

2. The control panel of claim 1, further comprising a pair of separated electrical contacts beneath the decorative surface at each of said locations, wherein the slider switch conductively connects the pair of electrical contacts at the location of the user-applied pressure and disconnects the same pair of electrical contacts when the user-applied pressure is removed.

3. The control panel of claim 1, further comprising a conductive layer in contact with the variable resistance layer at each location, wherein the user-applied pressure electrically connects one electrical trace of the conductive layer with another electrical trace of the conductive layer at each location of the user-applied pressure and the electrical traces are disconnected at the same location when the user-applied pressure is removed.

4. The control panel of claim 1, further comprising a first conductive layer in contact with one side of the variable resistance layer, and a second conductive layer in contact with an opposite side of the variable resistance layer, wherein the user-applied pressure electrically connects the first conductive layer with the second conductive layer at each location of the user-applied pressure and the conductive layers are disconnected at the same location when the user-applied pressure is removed.

5. The control panel of claim 1, further comprising a conductive layer printed on the variable resistance layer, a decorative layer, or a transparent layer.

6. The control panel of claim 1, further comprising an additional pressure-sensitive slider switch beneath the decorative surface, wherein the additional slider switch is configured to change a different parameter of the display panel when the user-applied pressure is moved from one location to another location along the decorative surface over the additional slider switch.

7. The control panel of claim 1, wherein the display panel includes a light source and said parameter is an intensity or a color of light from the light source.

8. The control panel of claim 1, wherein the control panel includes the display panel and further comprises a light source beneath the decorative surface, light from the light source being emitted from the display panel through the decorative surface.

9. The control panel of claim 1, wherein the decorative surface is provided by a fabric or a non-polymeric decorative layer.

10. The control panel of claim 1, wherein the decorative surface comprises a pattern of perforations that permit visible light to pass through when backlit and that are non-visible when not backlit.

11. The control panel of claim 9, further comprising a diffraction material that imparts a radial component to a direction of light passing through the perforations.

12. The control panel of claim 1, further comprising a base, a deco panel supported by the base, and a light source disposed between the base and the deco panel, wherein the deco panel has a uniform thickness and the slider switch is located within the thickness of the deco panel.

13. The control panel of claim 1, wherein the location of the slider switch is non-visible.

14. The control panel of claim 1, further comprising a wireless charger beneath the decorative surface, wherein at least a portion of the slider switch overlaps the wireless charger.

15. The control panel of claim 1, wherein the control panel is not a capacitive touch panel.

16. A vehicle interior control panel comprising a deco panel and a pressure-sensitive switch located within a thickness of the deco panel, the pressure sensitive switch comprising:

a variable resistance layer having a locally reduced electrical resistance where an external compressive force is applied; and a conductive layer in contact with the variable resistance layer beneath a decorative surface of the deco panel, the variable resistance layer and the conductive layer being different layers of the panel, wherein the conductive layer includes a first electrical contact and a separate second electrical contact, each electrical contact being in contact with the variable resistance layer at a location along the panel such that:

when a user-applied pressure is applied at said location, the electrical resistance of the variable resistance layer is reduced at said location, thereby electrically connecting the first electrical contact and the second electrical contact via the variable resistance layer and completing an electrical circuit, and when the user-applied pressure is removed at said location, the first electrical contact and the second electrical contact are disconnected, and the circuit is opened.

17. The control panel of claim 16, wherein the conductive layer comprises:

a power trace configured to accept an applied voltage, the power trace comprising the first electrical contact; and an electrical trace associated with the pressure-sensitive switch and configured for connection with a controller, the electrical trace comprising the second electrical contact, wherein the user-applied pressure electrically connects the power trace with the electrical trace at said location, and the power trace and electrical trace are disconnected at the same location when the user-applied pressure is removed.

18. The control panel of claim 17, further comprising a light source, wherein the controller controls a parameter of the light source in response to the electrical circuit being completed.

19. The control panel of claim 16, wherein each of the first electrical contact and the second electrical contact comprises a set of fingers, each set of fingers being interlaced with the other set of fingers at said location.

20. The control panel of claim 16, wherein the pressure-sensitive switch is a pressure-sensitive slider switch configured to change a parameter of a display panel when the user-applied pressure is moved from said location to another location along the decorative surface.

* * * * *